Figure 1:
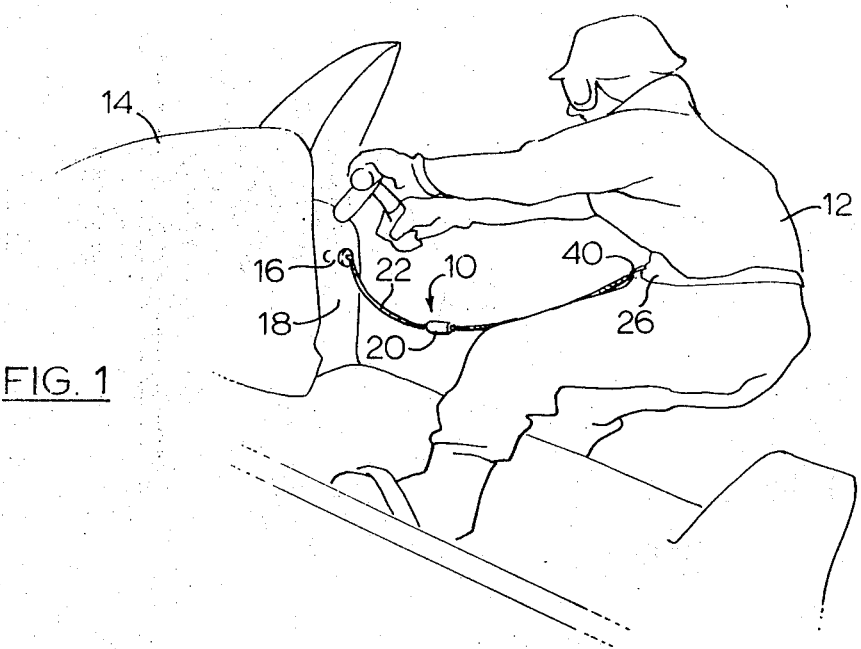

United States Patent [19]

Graydon et al.

[11] 3,825,092

[45] July 23, 1974

[54] SAFETY DEVICE FOR MOBILE CONVEYANCES

[76] Inventors: Kenneth Graydon, 298 Wellington St.; Harley W. Douglas, 38A King St. East, both of Ingersoll, Ontario, Canada

[22] Filed: Apr. 10, 1972

[21] Appl. No.: 242,581

[52] U.S. Cl.............. 180/82 R, 24/201 TR, 180/99
[51] Int. Cl........................................... B60k 27/08
[58] Field of Search.......... 180/82 C, 99, 82 R, 193; 24/230 R, 201 TR

[56] References Cited
UNITED STATES PATENTS

| | | | |
|---|---|---|---|
| 1,881,251 | 10/1932 | Tobener | 180/82 R |
| 2,722,575 | 11/1955 | Dobkins | 180/82 R |
| 2,725,947 | 12/1955 | Dooley | 180/82 R |
| 3,267,899 | 8/1966 | Kimball | 24/230 R |
| 3,439,387 | 4/1969 | Churches | 24/230 R |

*Primary Examiner*—David Schonberg
*Assistant Examiner*—Terrance L. Siemens

[57] ABSTRACT

The device is used in conjunction with conveyances powered by internal combustion engines having electrical ignition systems. The device includes an on-off switch which is connected in series with the ignition system and which includes a plunger which moves from a retracted position in which the electrical system is activated to an extended position in which the engine is shut down. A cord is connected at one end to the plunger and at the other end, to attachment means which is adapted to be releasably connected to the driver of the conveyance. Incorporated in the cord is a severable member which, upon application by the cord of a tensile force greater than the force required to move the plunger from a retracted position to an extended position under normal weather conditions, separates so that the cord no longer interconnects the plunger and the attachment means. The cord is of sufficient length to accommodate movement of the driver while on the conveyance only so that upon removal of the driver from the conveyance, the cord becomes taut with resulting movement of the plunger from a retracted to an extended position thereby shutting off the engine.

3 Claims, 2 Drawing Figures

PATENTED JUL 23 1974 3,825,092

SAFETY DEVICE FOR MOBILE CONVEYANCES

This invention relates to safety devices adapted to protect drivers of conveyances such as vehicles, boats and the like from accidents. More particularly, the invention relates to an ignition control device connected at one end to the driver of an internal combustion-operated conveyance. The device separates into parts to free the driver from the conveyance should he be accidentally ejected therefrom but, under normal conditions before separating into parts, the device causes the engine to shut down.

Heretofore, many safety devices have been proposed for operators of conveyances powered by internal combustion engines, particularly for tractor operators. Many such devices incorporate an ignition control switch which is connected to a flexible cord and is operated by tightening of the cord. The other end of the cord is connected to the driver of the conveyance. Should the driver accidentally fall from the conveyance, the cord becomes taut thereby causing the control switch to open the electrical ignition circuit whereupon the engine shuts down.

The above-described safety devices are unsatisfactory for the reason that they connect the driver to the conveyance whether or not the driver is on the conveyance. Where there is a risk that tightening of the cord will not result in shutting down of the engine, the safety device will be positively dangerous in use since the fallen driver will be dragged behind the moving conveyance by the cord. Where, for example, the safety device is used in conjunction with a snowmobile, the ignition control switch may become frozen and be impossible to open when the flexible cord is tightened. Should the driver be thrown from the vehicle, he may be severely injured as he is being dragged behind the moving machine. Similarly, where the device is used in conjunction with a so-called "swamp buggy," some of the mud through which the vehicle is travelling may spatter onto the ignition control switch and inhibit its free movement which is essential to safe operation of the safety device.

It is an object of the present invention to provide a safety device of the class previously described but incorporating into the flexible cord a severable member which will separate when sufficient force is applied thereto. The force required to separate the member is greater than that normally required to move the ignition switch to a position at which the engine is shut down but is less than the force which is exerted by the driver when he falls from the conveyance. The safety device will cause the engine to stop under normal circumstances and when the force on the cord exceeds a predetermined value will separate thereby ensuring that the driver is not dragged behind the moving vehicle.

Another object is to provide a safety device having a severable member which will separate as required under adverse weather conditions and, according to a preferred embodiment, thereof may be easily reassembled by the driver.

These and other objects may be accomplished by a safety device for the drivers of mobile conveyances such as vehicles, boats and the like, said conveyances being powered by internal combustion engines including an electrical ignition system, said device comprising: an electrical cut-off switch adapted to be connected in circuit with said electrical ignition system, said switch having a plunger and being operated by movement of said plunger from a retracted position in which said switch, when the conveyance is in operation, serves to maintain the ignition system in an energized state to an extended position in which said switch causes the ignition system to become de-energized; attachment means adapted to be releasably connected to the driver; a flexible cord interconnecting said plunger and said attachment means; and a severable member incorporated in said cord, said member, upon application by said cord of a tensile force greater than the force required to move said plunger from a retracted position to an extended position under normal weather conditions separating so that said cord no longer interconnects said plunger and said attachment means, said cord being of sufficient length to accommodate movement of the driver while on the conveyance only so that upon removal of the driver from the conveyance, the cord becomes taut with resulting movement of the plunger from a retracted to an extended position thereby shutting off the engine.

Figure 2:
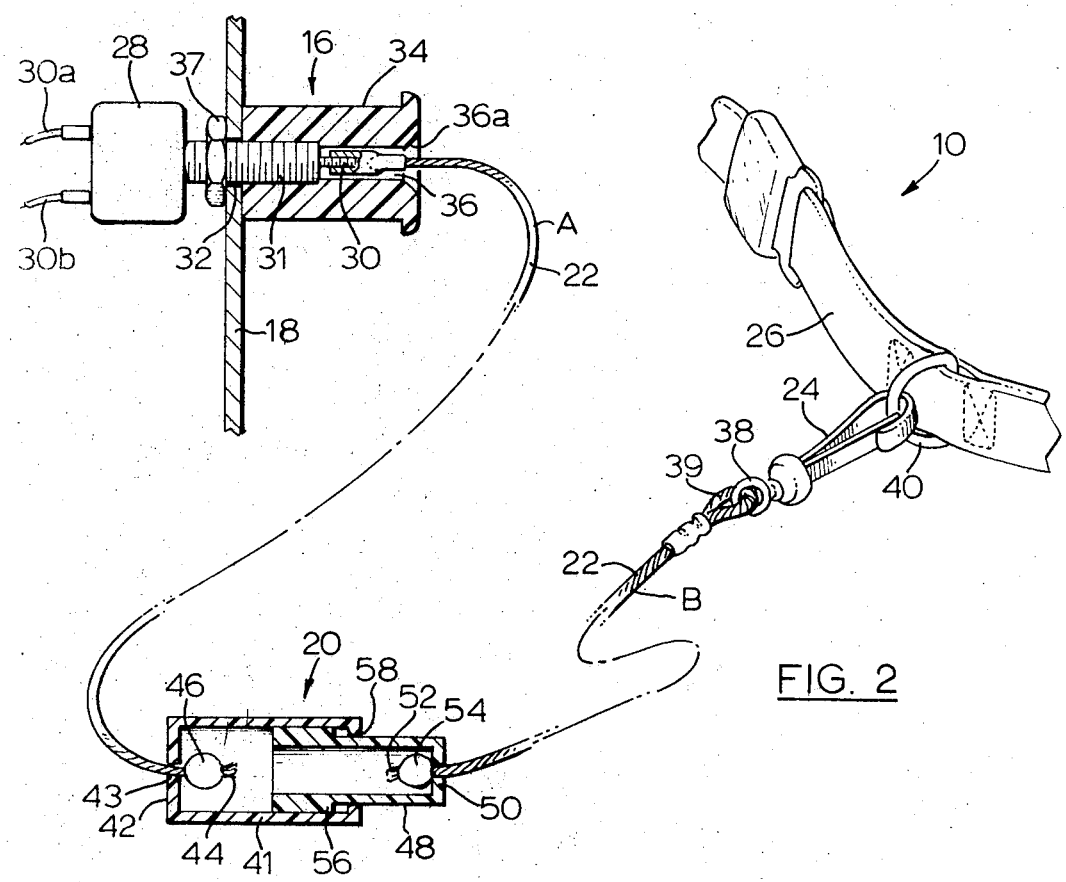

The invention will be more fully described with reference to the following drawing which shows a preferred embodiment of the subject safety device. In the drawing:

FIG. 1 is a pictorial representation of a snowmobile with the driver standing thereon and wearing the safety device of the invention; and FIG. 2 is a layout view of the component parts of the safety device.

Like reference characters refer to like parts throughout the disclosure.

With reference to FIG. 1, the safety device, generally 10 is shown being worn by a driver 12 standing on snowmobile 14. It should be noted that the snowmobile is depicted in the drawing for purposes of illustration only inasmuch as the safety device may be used in conjunction with any conveyance having an internal combustion engine. The safety device comprises an electrical cut-off switch assembly 16 mounted conveniently on the dashboard 18 of the conveyance and a severable member 20 incorporated in a flexible cord 22. One end of the cord is attached to a snap hook 24 which is releasably attached to the driver's belt 26 while the other end of the cord is attached to switch 16.

Referring to FIG. 2, cut-off switch assembly 16 incorporates a conventional double-pole single throw switch 28 activated by a plunger 30. The plunger is connected to an end of cord 22 and is shown in a retracted position. The plunger may be spring-biased in such position to maintain switch 28 in either an open or a closed position. In withdrawing the cord outwardly, a force is applied to the plunger against the bias of the spring and the plunger moves to an extended position thereby either closing or opening the switch depending on whether the switch was previously open or closed when the plunger was in a retracted position. A spring-biased plunger is preferred where instantaneous opening or closing of the cut-off switch will result in shutting down of the engine. Where, however, the switch must be left open or closed for several seconds or longer before the engine will shut down, plunger 30 should not of course be spring-biased but should remain in an extended position when pulled outwardly by the cord and should not return to a retracted position until pushed back manually.

Double-pole switch 28 has electrical leads 30a and 30b which may be connected in series in the engine ignition circuit, in an electrical line running from the coil of the engine to ground and so on. The switch may be connected in circuit anywhere in the ignition system provided that closing or opening of the switch will cause the engine to shut down. Of course, where opening of the switch causes the engine to shut down, the switch must be closed when plunger 30 is in a retracted position and must open when the plunger is moved outwardly by the cord.

Plunger 30 is mounted within an externally threaded sleeve 31 which is attached at one end to switch 28 and which extends through an aperture 32 formed in the dashboard. The portion of the sleeve which extends outwardly from the dashboard is connected to a socket 34 having an axial opening 36 which is threaded in part for threadable engagement with sleeve 31. The outer end of the axial opening is bevelled at 36a to allow cord 22 to be pulled from a number of directions without snagging on the end of the opening. A locknut 37 is tightened against the interior wall of the dashboard to hold the cut-off switch assembly in place.

At the opposite end of cord 22, snap hook 24 has a swivel eye 38 connected to the looped end 39 of the cord and the hook is releasably connected to a D-ring 40 of belt 26.

Severable member 20 is composed of an outer cylindrical element 41 having a closed end wall 42 formed with an aperture 43 for receipt of an end 44 of the cord, said end being held within the cylinder by means of an enlarged bead 46 attached thereto. An inner cylindrical element 48 is disposed coaxially of element 40 and also has closed end wall 50 in which an end 52 of the cord is received and retained by means of bead 54.

Inner element 48 is slideable axially within outer element 41. An annular lip 56 formed on the outer wall of element 48 adjacent its open end cooperates with an annular stop 58 formed in the inner wall of element 41 adjacent its free end to prevent the two elements from being separated in normal operation.

Preferably, the components of the severable member are formed of strong but somewhat flexible material such as nylon so that they will bend rather than fracture when moderate forces are applied thereto. The radially inner circular edge of stop 58 is rounded so that when a tensile force of sufficient magnitude is applied by both part A and part B of cord 22 to the severable member, the cylindrical wall of outer element 41 will flex sufficiently to permit the stop to move radially outwardly as lip 56 bears against it thereby allowing the inner element to separate from the outer element. In like manner, when the two elements are apart, they may be interconnected as shown by applying sufficient inward force to stop 58 by the free end of lip 56 to cause the cylindrical wall of element 41 to flex thereby allowing the lip to pass by the enlarged free end of the element.

In operation, the safety device is connected as shown in the drawing. When the driver is on the snowmobile, the cord will be slack and the cut-off switch will not interfere with the operation of the engine. Should the driver be precipitated from the vehicle, the cord will tighten thereby drawing plunger 30 outwardly and shutting off the engine. When the tensile force applied to the severable member by the cord is sufficient to cause the inner member 48 to separate from the outer member 41, the driver will be released from the vehicle.

It should be noted that the force required to draw plunger 30 outwardly must be less than that required to separate the elements of severable member 20 so that the engine will shut down before the driver is released from the vehicle. If this were otherwise, the engine would not stop when the driver was released and the safety device would serve no useful purpose whatever. Furthermore of course, the force required to withdraw the plunger and to separate the components of the severable member must not be so great that the weight of the driver being dragged behind the vehicle by the cord is insufficient to produce the required force. In addition, the cord must be of sufficient length to accommodate movement of the driver while on the vehicle only so that upon removal of the driver therefrom, the cord will become taut.

It will be understood of course, that modifications can be made in the embodiments of the safety device illustrated and described herein without departing from the scope and purview of the invention as defined in the appended claims. For example, the severable member may be a one-piece frangible element which fractures upon application of a predetermined force. Such a construction may be preferred where cost is of primary importance. Other modifications will readily occur to those skilled in the art.

What we claim as new and desire to protect by Letters Patent of the United States is:

1. In a safety device for the drivers of mobile conveyances such as vehicles, boats and the like, said conveyances being powered by internal combustion engines including an electrical ignition system, an electrical cut-off switch adapted to render said electrical ignition system operative or inoperative selectively, attachment means adapted to be releasably connected to the driver, a flexible cord connected to said attachment means and to a movable actuation plunger in said switch, the improvement comprising: a severable member incorporated in said cord to separate said cord into two sections, one section of which being connected to said attachment means and the other section being connected to said actuation plunger, said severable member including two portions releasably engaged together, one portion of which being connected to one free end of said one section of said cord and the other portion being connected to the free end of said other section of said cord, said two portions comprising an outer cylinder and an inner cylinder operatively and axially aligned with and operative to be received at least in part within said outer cylinder, said inner cylinder having a collar formed on its peripheral outside edge portion, said outer cylinder having an inwardly projecting flange portion formed on its inner edge portion whereby when said inner cylinder is received within said outer cylinder said collar and said flange portion co-operate to prevent said inner cylinder from being removed from said outer cylinder unless a separating force greater than the force required to move said plunger from a retracted position to an extended position is applied to said outer and inner cylinders through said cord, said outer cylinder and said inner cylinder each having a closed end wall formed with an aperture for receipt of said one free end of said one section of said cord within said outer cylinder and for receipt of the other free end of said other section of said cord within said inner cylinder, said one free end being held within said outer cylinder by means of a first enlarged bead attached to said one free end, and the other free end of said other section of said cord being held within said inner cylinder by means of a second enlarged bead attached to said other free end.

2. The safety device according to claim 1 in which said severable member is formed of a strong and substantially elastic material.

3. The safety device according to claim 1 in which said plunger is received within an axial opening of said switch and said axial opening is bevelled to allow the cord to be pulled from any operating direction without snagging on said opening.

* * * * *